(12) United States Patent
Huang

(10) Patent No.: US 9,024,599 B2
(45) Date of Patent: May 5, 2015

(54) MULTI-PHASE DC-DC POWER CONVERTER

(71) Applicant: uPI Semiconductor Corp., Hsinchu County (TW)

(72) Inventor: Hua-Chiang Huang, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 111 days.

(21) Appl. No.: 13/802,815

(22) Filed: Mar. 14, 2013

(65) Prior Publication Data
US 2014/0176097 A1 Jun. 26, 2014

(30) Foreign Application Priority Data
Dec. 24, 2012 (TW) .............................. 101149572 A

(51) Int. Cl.
*H02M 3/158* (2006.01)
*G05F 1/59* (2006.01)

(52) U.S. Cl.
CPC ........................................ *G05F 1/59* (2013.01)

(58) Field of Classification Search
CPC . H02M 3/158; H02M 3/1584; H02M 3/1588; H02M 2003/1586
USPC .................. 323/225, 268, 271, 272, 285, 350
See application file for complete search history.

(56) References Cited

U.S. PATENT DOCUMENTS

| | | | |
|---|---|---|---|
| 5,406,468 A | 4/1995 | Booth | |
| 6,137,274 A * | 10/2000 | Rajagopalan | 323/272 |
| 6,414,470 B1 * | 7/2002 | Liu et al. | 323/272 |
| 6,839,252 B2 * | 1/2005 | Tai et al. | 363/65 |
| 6,922,044 B2 | 7/2005 | Walters et al. | |
| 7,019,502 B2 | 3/2006 | Walters et al. | |
| 7,474,086 B2 | 1/2009 | Chen et al. | |
| 7,915,875 B2 | 3/2011 | Asuke et al. | |
| 8,030,908 B2 * | 10/2011 | Huang | 323/237 |
| 8,085,015 B2 * | 12/2011 | Lee | 323/272 |
| 8,148,967 B2 | 4/2012 | Xing et al. | |
| RE43,414 E | 5/2012 | Walters et al. | |
| 8,174,250 B2 | 5/2012 | Wu et al. | |
| 8,816,657 B2 * | 8/2014 | Wang | 323/272 |
| 2010/0033154 A1 | 2/2010 | Cheng et al. | |
| 2012/0112721 A1 | 5/2012 | Wu et al. | |
| 2013/0057239 A1* | 3/2013 | Kalje et al. | 323/271 |

FOREIGN PATENT DOCUMENTS

TW I368123 7/2012

OTHER PUBLICATIONS

"Office Action of Taiwan Counterpart Application", issued on Jun. 13, 2014, p. 1-p. 5.

* cited by examiner

*Primary Examiner* — Gary L Laxton
(74) *Attorney, Agent, or Firm* — Jianq Chyun IP Office

(57) ABSTRACT

A multi-phase DC-DC power converter is provided, which includes a pulse width modulation (PWM) controller and a plurality of output stage circuits. The plurality of output stage circuits converts an input voltage into an output voltage. The PWM controller includes a feedback circuit and a PWM generation module. The feedback circuit outputs a trigger signal according to the output voltage and a ramp signal. The PWM generation module at least generates a first PWM signal and a second PWM signal. In addition, a waveform of the first PWM signal partially overlaps a waveform of the second PWM signal at a logic high level.

12 Claims, 5 Drawing Sheets

MULTI-PHASE DC-DC POWER CONVERTER

CROSS-REFERENCE TO RELATED APPLICATION

This application claims the priority benefit of Taiwan application serial no. 101149572, filed on Dec. 24, 2012. The entirety of the above-mentioned patent application is hereby incorporated by reference herein and made a part of this specification.

TECHNICAL FIELD

The present invention relates to a direct current (DC)-DC conversion technology, and more particularly to a multi-phase DC-DC power converter.

BACKGROUND

A multi-phase DC-DC power converter is widely applied in different electronic devices. The technology of a constant on-time voltage regulator is applied in a power converter. Generally speaking, when a feedback voltage is smaller than a reference voltage, a constant on time (COT) voltage regulator may turn on a primary switch in a fixed period, and the constant on time voltage regulator may adjust a turn-off period of the primary switch, so as to provide a stable output voltage.

FIG. 1 is a schematic circuit diagram of a multi-phase DC-DC power converter in the prior art. Please refer to FIG. 1. A multi-phase DC-DC power converter 100 includes a plurality of output stage circuits 1021 to 102N, a pulse width modulation (PWM) controller 120, a resistor $R_{ESR}$, and an output capacitor C1, in which N is a positive integer. The multi-phase DC-DC power converter 100 converts an input voltage $V_{IN}$ received by an input node $N_{in}$ into an output voltage $V_{OUT}$. The multi-phase DC-DC power converter 100 includes 2N transistors MU1 to MUN and ML1 to MLN, N inductors L1 to LN, N control units 1101 to 110N, and a PWM controller 120. The transistors MU1 to MUN are coupled between the input node $N_{in}$ and nodes $N_1$ to $N_N$, respectively, whereas the transistors ML1 to MLN are coupled between the nodes $N_1$ to $N_N$ and the ground GND, respectively. The transistors MU1 to MUN and the transistors ML1 to MLN are N-type transistors and may be used as switches. In other different applications, the transistors MU1 to MUN and the transistors ML1 to MLN may also be P-type transistors or may be P-type transistors and N-type transistors at the same time. The control units 1101 to 110N receive PWM signals $S_{PWM1}$ to $S_{PWMN}$ provided by the PWM controller 120, and control whether to turn on the transistors MU1 to MUN and the transistors ML1 to MLN according to the PWM signals $S_{PWM1}$ to $S_{PWMN}$. The inductors L1 to LN are coupled between the nodes $N_1$ to $N_N$ and an output node $N_{out}$, respectively, in which the output voltage $V_{OUT}$ is output to a load 200 through the output node $N_{out}$. In addition, the output capacitor C1 is coupled between the output node $N_{out}$ and the ground GND, in which the resistor $R_{ESR}$ represents to output an equivalent series resistance (ESR) of the capacitor C1.

As shown in FIG. 1, the PWM controller 120 includes a ramp generator 130, a PWM generator 140, a compensation unit 150, an error amplifier 160, a comparator 170, a phase channel current sensor 180, and a phase channel selector 190. The error amplifier 160 receives a reference voltage $V_{REF}$ and an output voltage $V_{OUT}$, and generates an error signal $V_{ERR}$ according to a voltage difference between the reference voltage $V_{REF}$ and the output voltage $V_{OUT}$. The compensation unit 150 is coupled between the comparator 170 and an output terminal of the error amplifier 160, and the compensation unit 150 is used for compensating for the error signal $V_{ERR}$. The compensation unit 150 includes a resistor 152 and capacitors 154 and 155, in which the resistor 152 is coupled to the output terminal of the error amplifier 160, the capacitor 154 is coupled between the resistor 152 and the ground GND, and the capacitor 155 is coupled between the output terminal of the error amplifier 160 and the ground GND. After the compensation for the error signal $V_{ERR}$ is completed, the comparator 170 compares the error signal with a ramp signal $S_{RAMP}$ provided by the ramp generator 130, so as to generate a trigger signal $S_{TR}$. Next, the PWM generator 140 and the phase channel selector 190 generate PWM signals $S_{PWM1}$ to $S_{PWMN}$ according to the trigger signal $S_{TR}$, the input voltage $V_{IN}$, and the output voltage $V_{OUT}$. The ramp generator 130 generates the ramp signal $S_{RAMP}$ only according to the PWM signals $S_{PWM1}$ to $S_{PWMN}$, the input voltage $V_{IN}$, and the output voltage $V_{OUT}$. The phase channel current sensor 180 senses currents I1 to IN flowing through the inductors L1 to LN, and after calculation, the error currents IB1 to IBN between all channels are imported into the PWM generator 140, and the PWM generator 140 is used for adjusting the duty cycles of the PWM signals $S_{PWM1}$ to $S_{PWMN}$.

However, in the measures in the prior art, the PWM signals $S_{PWM1}$ to $S_{PWMN}$ are unable to partially overlap each other, resulting in a slow transient response. FIG. 2 is a schematic timing diagram of a multi-phase DC-DC power converter 100 in two phase operations. Please refer to FIG. 1 and FIG. 2 together. In two phase operations, a PWM generator 140 generates a pulse wave signal $S_{PWM0}$, a phase channel selector 190 forms odd-numbered pulse waves of the pulse wave signal $S_{PWM0}$ into a PWM signal $S_{PWM1}$ and forms even-numbered pulse waves of the pulse wave signal $S_{PWM0}$ into another PWM signal $S_{PWM2}$, and as the two PWM signals $S_{PWM1}$ and $S_{PWM2}$ are separated by a minimum off time, a waveform of the PWM signal $S_{PWM1}$ is unable to partially overlap a waveform of the PWM signal $S_{PWM2}$ at a logic high level. As a minimum off time is required to separate PWM signals in a conventional architecture, the application of the multi-phase DC-DC power converter 100 at a high duty cycle is greatly limited.

SUMMARY

The present invention proposes a direct current (DC)-DC power converter in which the widths of multi-phase pulse waves are capable of partially overlapping each other, so as to solve the problems in the prior art.

The present invention provides a multi-phase DC-DC power converter, which includes a plurality of output stage circuits, a feedback circuit, a phase channel selector, a PWM generator, and a phase channel current sensor. The plurality of output stage circuits is configured to convert an input voltage into an output voltage. The feedback circuit outputs a trigger signal according to the output voltage and a ramp signal. The phase channel selector generates at least two channel setting signals according to the trigger signal. The PWM generator is coupled to the output stage circuits and the phase channel selector, and generates a plurality of PWM signals in response to a plurality of error current signals, the input voltage, the output voltage, and the channel setting signals. The phase channel current sensor is configured to sense output currents of the output stage circuits, and calculates output current differences between output stage circuits, so as to output the error current signals to the PWM generator, and the PWM generator adjusts the duty cycle of each PWM signal according to the error current signals.

Furthermore, the present invention provides another multi-phase DC-DC power converter, which includes a plurality of output stage circuits and a PWM controller. The output stage circuits are configured to convert an input voltage into an output voltage. The PWM controller is coupled to input terminals and output terminals of the output stage circuits. The PWM controller generates a plurality of PWM signals according to the input voltage, the output voltage and a reference voltage, so as to control the output stage circuits. The PWM controller includes a feedback circuit and a PWM generation module. The feedback circuit outputs a trigger signal according to the output voltage and a ramp signal. The PWM generation module is used for generating a first PWM signal with a fixed on time and a second PWM signal with the fixed on time. Also, the PWM generation module adjusts the duty cycles of the first PWM signal and the second PWM signal according to the trigger signal, the input voltage, and the output voltage.

In an exemplary embodiment of the present invention, the PWM generator includes a first PWM comparator, a first flip-flop, a second PWM comparator, and a second flip-flop. The first PWM comparator generates a first channel reset signal according to one of the error current signals, the input voltage, and the output voltage. The first flip-flop generates a first PWM signal in response to the first channel reset signal and the first channel setting signal. The second PWM comparator generates a second channel reset signal according to another one of the error current signals, the input voltage, and the output voltage. The second flip-flop generates a second PWM signal in response to the second channel reset signal and the second channel setting signal.

In an exemplary embodiment of the present invention, the feedback circuit includes an error amplifier and a comparator. The error amplifier is used for receiving a reference voltage and an output voltage, and generates an error signal according to a voltage difference between the reference voltage and the output voltage. A first input terminal of the comparator is coupled to an output terminal of the error amplifier, and the comparator is used for performing comparison between the error signal and the ramp signal to generate a trigger signal.

In an exemplary embodiment of the present invention, the feedback circuit includes a compensation unit. The compensation unit is coupled between an output terminal of an error amplifier and a working voltage.

In an exemplary embodiment of the present invention, the compensation unit includes a resistor. The resistor is coupled between an output terminal of the error amplifier and a first input terminal of the comparator, and the compensation unit generates a compensation signal according to the error signal and a voltage across the resistor to compensate for the error signal.

In an exemplary embodiment of the present invention, the PWM generation module includes a phase channel selector, a PWM generator, and a phase channel current sensor. The phase channel selector generates at least two channel setting signals according to a trigger signal. The PWM generator is coupled to output stage circuits and the phase channel selector, and generates a plurality of PWM signals in response to a plurality of error current signals, an input voltage, an output voltage, and the channel setting signals. The phase channel current sensor is configured to sense output currents of the output stage circuits, and calculate output current differences between the output stage circuits to output the error current signals to the PWM generator, and the PWM generator adjusts the duty cycle of each PWM signal according to the error current signals.

In an exemplary embodiment of the present invention, waveforms of at least two of the PWM signals overlap each other at a logic high level.

Based on the above, in the present invention, a trigger signal is divided into a plurality of channel setting signals, and a corresponding PWM signal is then generated independently based on each channel setting signal, so that the PWM signals are no longer limited by a minimum off time. Further, the waveforms of any two PWM signals may partially overlap each other at a logic high level, thereby effectively solving the problem of being incapable of partial overlapping in the prior art. Therefore, the present invention is no longer limited by a minimum off time, and is capable of operating settings at a high duty cycle, and facilitates the application in heavy load conditions.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
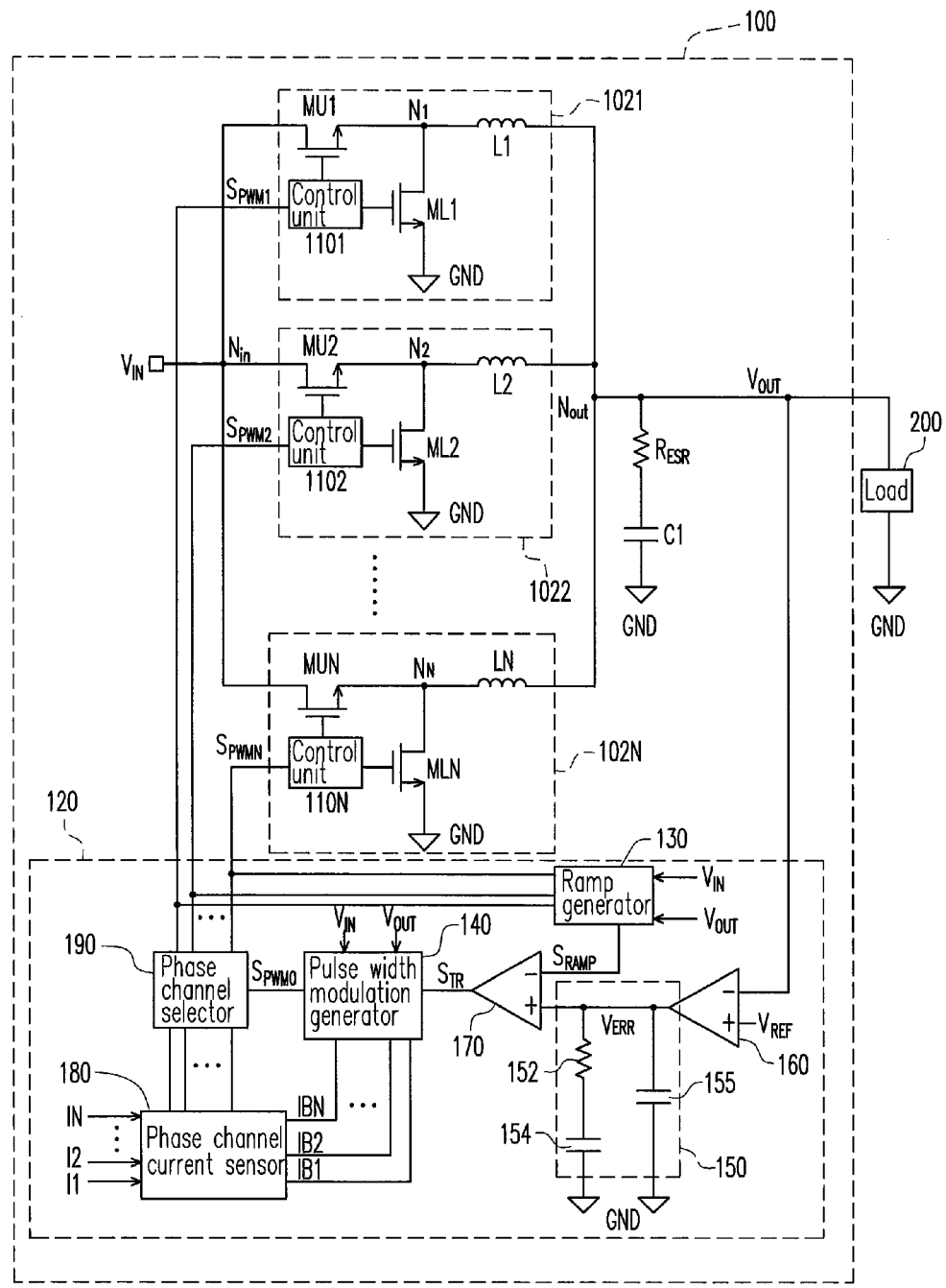
FIG. 1 is a schematic circuit diagram of a multi-phase DC-DC power converter in the prior art.

Detailed reference is made to the embodiments of the present invention and the examples of the embodiments are illustrated in the accompanying drawings. In addition, the elements/members with the same or similar numbers are used in the drawings and implementation manners to represent the same or similar parts.

In order to make the aforementioned and other objectives, features, and advantages of the present invention comprehensible, embodiments accompanied with figures are described in detail below.

Figure 3:
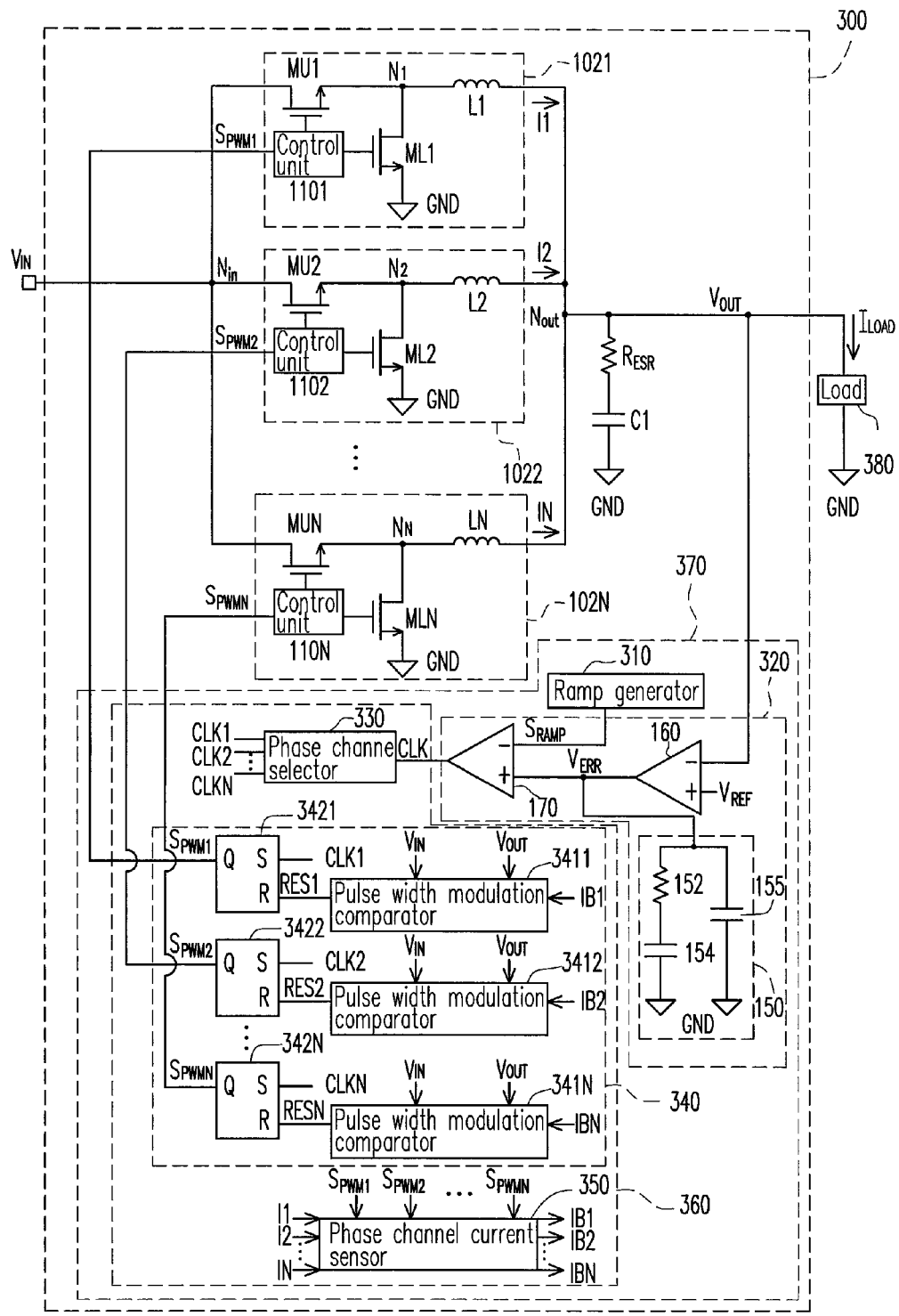
FIG. 3 is a schematic view of a multi-phase DC-DC power converter according to an embodiment of the present invention.

FIG. 3 is a schematic view of a multi-phase DC-DC power converter 300 according to an embodiment of the present invention. Please refer to FIG. 3. The multi-phase DC-DC power converter 300 includes a plurality of output stage circuits 1021 to 102N, a PWM controller 370, a resistor $R_{ESR}$, and an output capacitor C1, in which N is a positive integer. The output stage circuits 1021 to 102N are connected in parallel between an input node $N_{in}$ and an output node $N_{out}$, and are used for converting an input voltage $V_{IN}$ received by the input node $N_{in}$ into an output voltage $V_{OUT}$ and outputting the output voltage $V_{OUT}$ through the output node $N_{out}$. The PWM controller 370 is coupled to input terminals and output terminals (that is, the output node $N_{out}$) of the output stage circuits 1021 to 102N, and is used for outputting a first PWM signal $S_{PWM1}$, a second PWM signal $S_{PWM2}$, ..., and an Nth PWM signal $S_{PWMN}$, so as to enable the PWM signals to control the output stage circuits 1021 to 102N in sequence, thereby converting the input voltage $V_{IN}$ into an output voltage $V_{OUT}$. In addition, the resistor $R_{ESR}$ is an equivalent series resistance (ESR) of the output capacitor C1, and includes a low resistance value. As can be seen from FIG. 3, the output capacitor C1 including a low ESR is coupled between the output node $N_{out}$ and the ground GND, and the load 380 is coupled between the output node $N_{out}$ and the ground GND.

The PWM controller 370 includes a ramp generator 310, a feedback circuit 320, and a PWM generation module 360. The ramp generator 310 here is used for generating a ramp signal $S_{RAMP}$. It should be noted that the ramp generator 310, compared with the ramp generator 130 in FIG. 1, generates a ramp signal $S_{RAMP}$ without receiving an input voltage $V_{IN}$ and an output voltage $V_{OUT}$. The feedback circuit 320 is coupled to the ramp generator 310, the output terminals (that is, the output node $N_{out}$) of the output stage circuits 1021 to 102N, and the PWM generation module 360. The feedback circuit 320 outputs a trigger signal CLK according to the output voltage $V_{OUT}$ and the ramp signal $S_{RAMP}$.

Here, the feedback circuit 320 includes a compensation unit 150, an error amplifier 160, and a comparator 170. A first input terminal and a second terminal of the error amplifier 160 receive a reference voltage $V_{REF}$ and an output voltage $V_{OUT}$, respectively, and generate an error signal $V_{ERR}$ according to the voltage difference between the reference voltage $V_{REF}$ and the output voltage $V_{OUT}$. The compensation unit 150 is coupled between the first input terminal of the comparator 170 and the output terminal of the error amplifier 160, and the compensation unit 150 is used for compensating for the error signal $V_{ERR}$.

In this embodiment, the compensation unit 150 includes a resistor 152, a capacitor 154, and a capacitor 155. The resistor 152 and the capacitor 154 are connected in series between the output terminal of the error amplifier 160 and a working voltage. The capacitor 155 is coupled between the output terminal of the error amplifier 160 and the working voltage. In some embodiments, the working voltage is the electric potential of the ground GND. After the compensation unit 150 completes the compensation for the error signal $V_{ERR}$, the comparator 170 compares the error signal $V_{ERR}$ with the ramp signal $S_{RAMP}$ provided by the ramp generator 130 to generate a trigger signal CLK.

The PWM generation module 360 includes a phase channel selector 330, a PWM generator 340, and a phase channel current sensor 350, in which the phase channel selector 330 is coupled to the output terminal of the comparator 170. The PWM generation module 360 is used for generating a first PWM signal $S_{PWM1}$ including a first fixed on time, a second PWM signal $S_{PWM2}$ including a second fixed on time, ..., and an Nth PWM signal $S_{PWMN}$ including an Nth fixed on time. The waveforms of any two PWM signals partially overlap each other at a logic high level. For example, referring to FIG. 4, the waveform of the first PWM signal $S_{PWM1}$ partially overlaps the waveform of the second PWM signal $S_{PWM2}$ at a logic high level. Also, the PWM generation module 360 adjusts the duty cycles of the first PWM signal $S_{PWM1}$, the second PWM signal $S_{PWM2}$, ..., and the Nth PWM signal $S_{PWMN}$ according to the trigger signal CLK, the input voltage $V_{IN}$, and the output voltage $V_{OUT}$.

The PWM generation module 360 is further illustrated. The PWM generation module 360 includes a phase channel selector 330, a PWM generator 340, and a phase channel current sensor 350. The phase channel selector 330 is coupled to the output terminal of the feedback circuit 320 and is capable of generating a first channel setting signal CLK1, a second channel setting signal CLK2, ..., and an Nth channel setting signal CLKN according to the trigger signal CLK. The PWM generator 340 is coupled to the phase channel selector 330, the phase channel current sensor 350, and the output stage circuits 1021 to 102N.

The PWM generator 340 includes PWM comparators 3411 to 341N and flip-flops 3421 to 342N. The PWM comparator 3411 generates a first channel reset signal RES1 according to the error current signal IB1 of the output stage circuit 1021, the input voltage $V_{IN}$, and the output voltage $V_{OUT}$. A reset terminal (R) of the flip-flop 3421 is coupled to the PWM comparator 3411, and a setting terminal (S) of the flip-flop 3421 is coupled to the phase channel selector 330, and generates a first PWM signal $S_{PWM1}$ according to the first channel reset signal RES1 and the first channel setting signal CLK1. Similarly, the PWM comparator 3412 generates a second channel reset signal RES2 according to the error current signal IB2 of the output stage circuit 1022, the input voltage $V_{IN}$, and the output voltage $V_{OUT}$. The flip-flop 3422 is coupled to the second PWM comparator 3412 and the phase channel selector 330, and generates a second PWM signal $S_{PWM2}$ according to the second channel reset signal RES2 and the second channel setting signal CLK2. Similarly, the flip-flop 342N is capable of generating an Nth PWM signal $S_{PWM}$. In addition, the flip-flops 3421 to 342N may be D-type flip-flops; however, the present invention is not limited thereto.

The phase channel current sensor 350 senses the output currents I1 to IN of the output stage circuits 1021 to 102N, and calculates the output current differences IB1 to IBN between the output stage circuits 1021 to 102N, so as to output the error current signals IB1 to IBN to the corresponding PWM comparators 3411 to 341N, respectively.

The PWM generator 340 and the phase channel current sensor 350 generate PWM signals $S_{PWM1}$ to $S_{PWMN}$ according to the first channel setting signal CLK1, the second channel setting signal CLK2, ..., and the Nth channel setting signal CLKN, the input voltage $V_{IN}$, the output voltage $V_{OUT}$, and the output current differences IB1 to IBN between the output stage circuits 1021 to 102N, and output the PWM signals $S_{PWM1}$ to $S_{PWMN}$ to the corresponding output stage circuits 1021 to 102N.

In this embodiment, each output stage circuit is implemented by using one control unit, two transistors, and one inductor. As shown in FIG. 3, the multi-phase DC-DC power converter 300 includes 2N transistors MU1 to MUN and ML1 to MLN, N inductors L1 to LN, and N control units 1101 to 110N. The transistors MU1 to MUN are coupled between the input node $N_{in}$ and the nodes $N_1$ to $N_N$, respectively, and the transistors ML1 to MLN are coupled between the nodes $N_1$ to $N_N$ and the ground GND, respectively. The gates of the transistors MU1 to MUN and the gates of the transistors ML1 to MLN are coupled to the control units 1101 to 110N, respectively. In addition, the inductors L1 to LN are coupled between the nodes $N_1$ to $N_N$ and the output node $N_{out}$, respectively. In this embodiment, the transistors MU1 to MUN and the transistors ML1 to MLN are N-type transistors, which may also be used as switches. In other different applications, the transistors MU1 to MUN and the transistors ML1 to MLN may also be P-type transistors or may use P and N-type transistors at the same time. The control units 1101 to 110N receive PWM signals $S_{PWM1}$ to $S_{PWMN}$ provided by the PWM controller 370, and control whether the transistors MU1 to MUN and the transistors ML1 to MLN are on according to the PWM signals $S_{PWM1}$ to $S_{PWMN}$, so as to convert the input voltage $V_{IN}$ into an output voltage $V_{OUT}$. The output voltage $V_{OUT}$ is output to the load 380 through the output node $N_{OUT}$.

Figure 2:
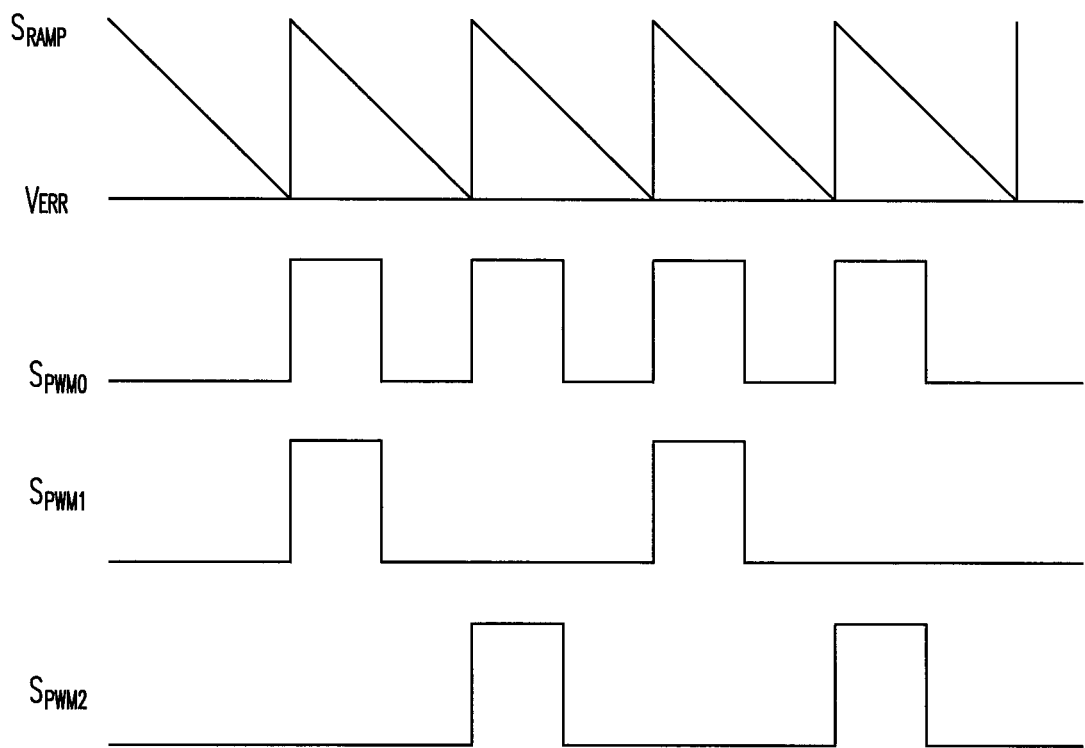
FIG. 2 is a schematic timing diagram of a multi-phase DC-DC power converter 100 in two phase operations.
Figure 4:
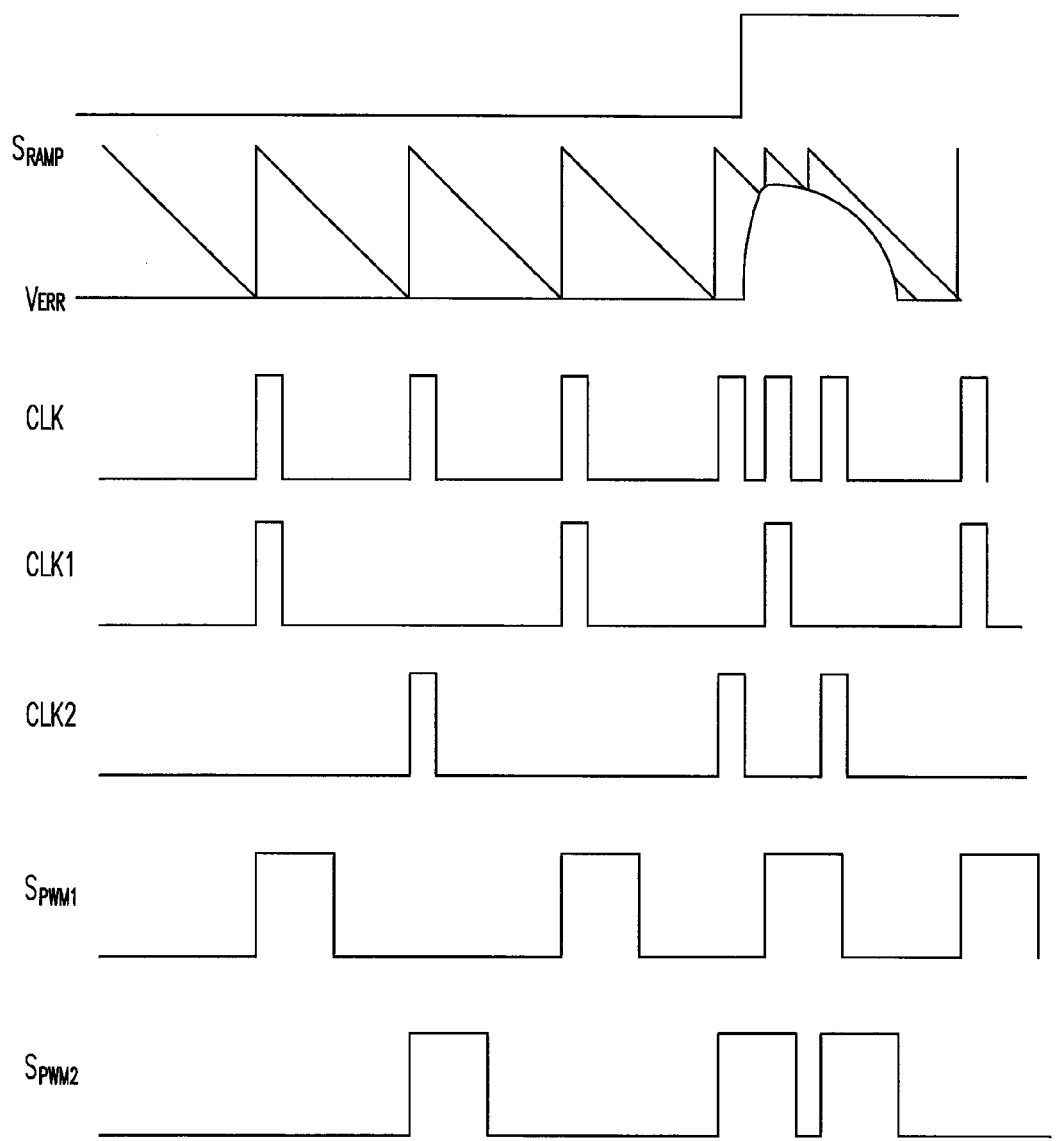
FIG. 4 is a schematic timing diagram of a multi-phase DC-DC power converter 300 in two phase operations according to an embodiment of the present invention.

FIG. 4 is a schematic timing diagram of a multi-phase DC-DC power converter 300 in two phase operations according to an embodiment of the present invention. Please refer to FIG. 3 and FIG. 4 together. In two phase operations, a trigger signal CLK passes through a phase channel selector 330 in sequence to generate a first channel setting signal CLK1, a second channel setting signal CLK2, and so on. The rising edges of the first channel setting signal CLK1 and the second channel setting signal CLK2 are applied to the flip-flops 3421 and 3422, respectively, causing that the first PWM signal $S_{PWM1}$ and the second PWM signal are at a logic high level, respectively, and for the on time of the first PWM signal $S_{PWM1}$/second PWM signal $S_{PWM2}$, each PWM comparator 3411/3412 generates a channel reset signal according to the input voltage $V_{IN}$, the output voltage $V_{OUT}$, and the error current signal IB1/IB2, respectively to the flip-flop 3421/3422. When the load current $I_{LOAD}$ increases, the frequency where the rise of the error signal $V_{ERR}$ and the ramp signal $S_{RAMP}$ cross becomes higher, that is, the frequency of the trigger signal CLK rises, and the frequency of the next first channel setting signal CLK1/second channel setting signal CLK2 also rises. As also can be seen from FIG. 4, the first PWM signal $S_{PWM1}$/second PWM signal $S_{PWM2}$ partially overlap during the on time. Compared with the prior art in FIG. 1 and FIG. 2, the $S_{PWM1}$ and the $S_{PWM2}$ in the prior art are unable to overlap partially, so during the transient state in the embodiment of the present invention, the time that the whole PWM signal is at the logic high level becomes longer, so that the transient state response becomes more rapid.

Figure 5:
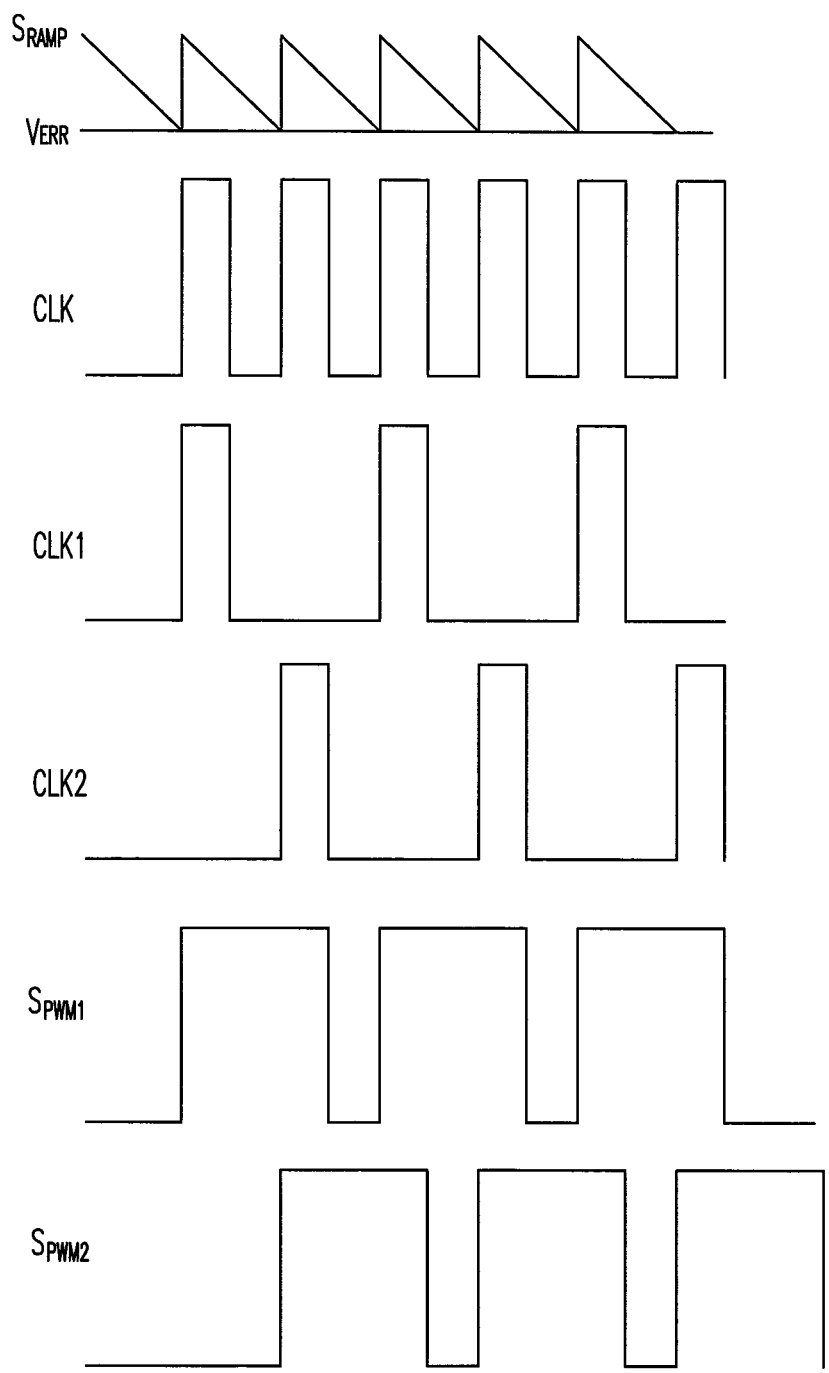
FIG. 5 is a schematic timing diagram of a multi-phase DC-DC power converter 300 according to another embodiment.

FIG. 5 is a schematic timing diagram of a multi-phase DC-DC power converter 300 according to another embodiment. Another important advantage of the multi-phase DC-DC power converter 300: the condition that the DC-DC buck control may be operated at a high duty cycle. By taking the two-phase operation as an example for illustration, as can be seen from FIG. 5, the present invention is capable of generating a first PWM signal $S_{PWM1}$/second PWM signal $S_{PWM2}$ having a high duty cycle. On the contrary, in the prior art, the pulse wave signal $S_{PWM0}$ passes through the phase channel selector 190 to generate the $S_{PWM1}$/$S_{PWM2}$ in sequence, as in FIG. 5, the trigger signal CLK passes through the phase channel selector 330 to generate the first channel setting signal CLK1/second channel setting signal CLK2 in sequence, so that in the prior art the maximum duty cycle of the $S_{PWM1}$/$S_{PWM2}$ is limited. As in the present invention the time that the whole PWM signal is at a logic high level becomes longer, the technology is able to be applied in a DC-DC controller and is capable of operating settings at a high duty cycle.

In conclusion, in the present invention, a trigger signal is divided into a plurality of channel setting signals, and a corresponding PWM signal is then generated independently based on each channel setting signal, so that the PWM signals are no longer limited by a minimum off time. Further, the waveforms of any two PWM signals may partially overlap each other at a logic high level, thereby effectively solving the problem of being incapable of partial overlapping in the prior art. Therefore, the present invention is no longer limited by a minimum off time, and is capable of operating settings at a high duty cycle, and facilitates the application in heavy load conditions.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A multi-phase direct current (DC)-DC power converter, comprising:
    a plurality of output stage circuits, configured to convert an input voltage into an output voltage;
    a feedback circuit, used for outputting a trigger signal according to the output voltage and a ramp signal;
    a phase channel selector, used for generating at least two channel setting signals according to the trigger signal;
    a pulse width modulation (PWM) generator, coupled to the output stage circuits and the phase channel selector, and used for generating a plurality of PWM signals in response to a plurality of error current signals, the input voltage, the output voltage, and the channel setting signals; and
    a phase channel current sensor, configured to sense output currents of the output stage circuits, and calculate output current differences between the output stage circuits, so as to output the error current signals to the PWM generator, wherein the PWM generator adjusts the duty cycle of each PWM signal according to the error current signals.

2. The multi-phase DC-DC power converter according to claim 1, wherein the PWM generator comprises:
    a first PWM comparator, used for generating a first channel reset signal according to one of the error current signals, the input voltage, and the output voltage;
    a first flip-flop, used for generating the first PWM signal in response to the first channel reset signal and the first channel setting signal;
    a second PWM comparator, used for generating a second channel reset signal according to another one of the error current signal, the input voltage, and the output voltage; and
    a second flip-flop, used for generating a second PWM signal in response to the second channel reset signal and the second channel setting signal.

3. The multi-phase DC-DC power converter according to claim 1, wherein the feedback circuit comprises:
    an error amplifier, used for receiving a reference voltage and the output voltage, and generating an error signal according to a voltage difference between the reference voltage and the output voltage; and
    a comparator, a first input terminal of which being coupled to an output terminal of the error amplifier, and used for comparing the error signal and the ramp signal to generate the trigger signal.

4. The multi-phase DC-DC power converter according to claim 3, wherein the feedback circuit further comprises:
    a compensation unit, coupled between the output terminal of the error amplifier and a working voltage.

5. The multi-phase DC-DC power converter according to claim 4, wherein the compensation unit comprises:
    a resistor, coupled between the output terminal of the error amplifier and the first input terminal of the comparator, wherein the compensation unit generates a compensation signal to compensate for the error signal according to the error signal and a voltage across the resistor.

6. The multi-phase DC-DC power converter according to claim 1, wherein waveforms of at least two of the PWM signals overlap at a logic high level.

7. A multi-phase DC-DC power converter, comprising:
a plurality of output stage circuits, configured to convert an input voltage into an output voltage; and
a pulse width modulation (PWM) controller, coupled to the output stage circuits, and used for generating a plurality of PWM signals according to the input voltage, the output voltage, and a reference voltage, so as to control the output stage circuits according to the plurality of PWM signals, and the PWM controller comprising:
a feedback circuit, used for outputting a trigger signal according to the output voltage and a ramp signal; and
a PWM generation module, used for generating a first PWM signal with a fixed on time and a second PWM signal with the fixed on time, and adjusting the duty cycles of the first PWM signal and the second PWM signal according to at least two channel setting signals, the input voltage, and the output voltage, wherein the PWM generation module comprises:
a phase channel selector, used for generating the channel setting signals according to the trigger signal.

8. The multi-phase DC-DC power converter according to claim 7, wherein the feedback circuit comprises:
an error amplifier, used for receiving the reference voltage and the output voltage, and generating an error signal according to a voltage difference between the reference voltage and the output voltage;
a comparator, used for comparing the error signal and the ramp signal to generate the trigger signal; and
a compensation unit, coupled between an output terminal of the error amplifier and a working voltage, and used for generating a compensation signal to compensate for the error signal.

9. The multi-phase DC-DC power converter according to claim 8, wherein the compensation unit comprises:
a resistor, coupled between the output terminal of the error amplifier and a first input terminal of the comparator, wherein the compensation unit generates the compensation signal according to the error signal and a voltage across the resistor.

10. The multi-phase DC-DC power converter according to claim 7, wherein the PWM generation module comprises:
a PWM generator, coupled to the output stage circuits and the phase channel selector, and used for generating a plurality of PWM signals in response to a plurality of error current signals, the input voltage, the output voltage, and the channel setting signals; and
a phase channel current sensor, configured to sense output currents of the output stage circuits, and calculate an output current difference between the output stage circuits, so as to output the error current signals to the PWM generator, wherein the PWM generator adjusts the duty cycle of each PWM signal according to the error current signals.

11. The multi-phase DC-DC power converter according to claim 10, wherein the PWM generator comprises:
a first PWM comparator, used for generating a first channel reset signal according to one of the error current signals, the input voltage, and the output voltage;
a first flip-flop, used for generating the first PWM signal in response to the first channel reset signal and the first channel setting signal;
a second PWM comparator, used for generating a second channel reset signal according to another one of the error current signals, the input voltage, and the output voltage; and
a second flip-flop, used for generating the second PWM signal in response to the second channel reset signal and the second channel setting signal.

12. The multi-phase DC-DC power converter according to claim 10, wherein waveforms of at least two of the PWM signals overlap at a logic high level.

* * * * *